United States Patent [19]
Caporali et al.

[11] 3,898,267
[45] Aug. 5, 1975

[54] PROCESS FOR PREPARING METHACRYLONITRILE FROM ISOBUTENE, AMMONIA AND OXYGEN, IN THE PRESENCE OF CATALYSTS

[75] Inventors: Giorgio Caporali; Nicola Giordano; Luciano Moreschini; Franco Faletti; Francesco Pignataro, all of Milan, Italy

[73] Assignee: Montecatini Edison S.p.A., Milan, Italy

[22] Filed: Apr. 27, 1973

[21] Appl. No.: 354,987

[30] Foreign Application Priority Data
Apr. 28, 1972 Italy................... 23699/72

[52] U.S. Cl. ............................. 260/465.3
[51] Int. Cl. ........................... C07c 121/02
[58] Field of Search ....................... 260/465.3

[56] References Cited
UNITED STATES PATENTS

| 3,226,421 | 12/1965 | Giordano et al. | 260/465.3 |
| 3,370,083 | 2/1968 | Ferlazzo et al. | 260/465.3 |
| 3,409,561 | 11/1968 | Ferlazzo et al. | 260/465.3 |
| 3,478,082 | 11/1969 | Huibers | 260/465.3 |
| 3,479,385 | 11/1969 | Huibers | 260/465 C |
| 3,541,129 | 11/1970 | Yamada et al. | 260/465.3 |
| 3,625,867 | 12/1971 | Yoshino et al. | 260/465.3 X |
| 3,642,930 | 2/1972 | Grasselli et al. | 260/465.3 X |
| 3,678,091 | 7/1972 | Reulet et al. | 260/465.3 |
| 3,766,092 | 10/1973 | Honda et al. | 260/465.3 X |

Primary Examiner—Joseph P. Brust

[57] ABSTRACT

The instant Application deals with a process for the manufacture of methacrylonitrile by the catalytic ammonoxidation of isobutylene at elevated temperature, in gaseous phase, in the presence of a catalyst consisting of the elements tellurium, cerium, molybdenum, of one or more of the elements selected from the group comprising lithium, sodium, potassium rubidium cesium and moreover of oxygen chemically combined with the above cited elements.

3 Claims, No Drawings

PROCESS FOR PREPARING METHACRYLONITRILE FROM ISOBUTENE, AMMONIA AND OXYGEN, IN THE PRESENCE OF CATALYSTS

This invention relates to a process for preparing methacrylonitrile by reaction, in the gas phase, of isobutene, ammonia and oxygen in the presence of solid catalysts.

Processes are already known for obtaining unsaturated alpha-beta nitriles starting from olefins, ammonia and oxygen and, in particular, for obtaining methacrylonitrile from isobutene, ammonia and oxygen, characterized in that different catalytic systems are employed. Among these a catalyst is known from Italian Pat. No. 682,880, containing tellurium, molybdenum or tungsten, cerium and oxygen, having the structure of a heteropolycompound, and from Italian Pat. No. 678,569 a catalytic combination comprising, besides the abovesaid elements, also vanadium.

An examination of the several patents reveals that the yields attainable in the preparation of methacrylonitrile are generally lower than those attainable in the preparation of acrylonitrile. Specific processes are already known for obtaining methacrylonitri-le from isobutene by operating in the presence of catalytic systems particularly optimized for this purpose.

Among these, Nitto French Pat. No. 1,335,033 and Japanese Pat. No. 26,391/64 may be cited, which use catalytic systems based on Mo/Bi/Sb.

Neither of these processes, however, are thoroughly satisfactory, if one considers that the conversions of isobutene to methacrylonitri-le do not exceed 60% on the average, and that the product is obtained along with considerable amounts of by-products such as acrylonitrile, acetonitrile and various carbonyl products which render the subsequent purification steps difficult. For the foregoing it follows therefore that a high methacrylonitrile yield is desirable not only because it corresponds to a low consumption of raw material, but also because it reduces the formation of hardly separable by-products.

The Applicant has now surprisingly found that it is possible to obtain excellent yields of methacrylonitrile and very low amounts of hardly separable by-products by causing isobutene to react with ammonia and oxygen in the presence of a new catalytic system optimized for such purpose.

The process according to the present invention consists in causing isobutene, ammonia and oxygen to react in the gas phase, optionally mixed with inert diluents such as nitrogen, steam etc., at a temperature comprised between 350° and 500°C for a contact time ranging from 0.1 to 20 seconds, in the presence of a catalyst consisting of the elements tellurium, cerium, molybdenum, of one or more of the elements selected from the group comprising lithium, sodium, potassium, rubidium, cesium, and moreover of oxygen. The catalytic system may also contain tungsten and/or vanadium. The abovesaid elements are present in the catalytic composition in such amounts, that the atomic ratios to one another correspond to the following formula:

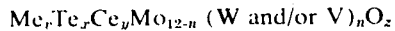

$$Me_r Te_x Ce_y Mo_{12-n}(W \text{ and/or } V)_n O_z$$

wherein:

Me is one or more of the elements Li, Na, K, Rb, Cs
$r$ is comprised between 0.3 and 18
$x$ is comprised between 0.3 and 24
$y$ is comprised between 0.3 and 21
$n$ is comprised between 0 and 8 and wherein $z$ varies within the wide limits corresponding to the oxygen quantity bound by the other elements (expressed as oxides) in the oxidation states in which they exist in the catalyst defin-ed by the empiric formula hereinbefore. For instance, if all the elements are considered as oxides in the state of their highest valence, $z$ is comprised between 33.65 and 159; but this is to be understood neither as an indication that the catalyst utilized in the process according to the invention consists thoroughly or partly of oxides, nor that the elements contained in these oxides are in the state of their maximum valence.

The catalytic composition can be used without carrier and, as such, it exhibits an excellent catalytic activity. For practical uses it is preferably used in combination with a carrier. As carrier it is possible to use any material suitable for the purpose, such as, for instance, silica, alumina, silicium carbide, silica-alumina, phosphates, silicates, borates, carbonates, provided they are stable to the reaction conditions they will be subjected to durinng the use of the catalyst.

The amount of active catalytic composition in relation to the carrier weight may vary within wide limits, according to the characteristics of the carrier and to the preparation method. The process object of this invention can be carried out by using the catalyst in the form of a fixed or fluidized bed; in the latter case, which, as is known, offers some advantages as regards the thermal control of the reaction particular importance is to be attached to both carrier nature and preparation method in order to obtain a microspheroidal catalyst with a suitable granulometric distribution.

A microspheroidal catalyst can be obtained according to several methods: for instance, by spray-drying a solution or suspension of the carrier and of the components of the catalytically active composition, or by impregnating a preformed microspheroidal carrier with a solution of the catalytically active composition's components.

For preparing the catalyst it is possible to use all the proper methods already known to those skilled in the art. Suitable methods of preparing a supported catalyst to be employed in the form of microspheroidal particles in a catalytic fluidized bed reactor are in particular those described in Italian Pat. Nos. 751,285 and 789,588.

As starting compounds for preparing the catalytic composition according to this invention the following compounds of the alkaline metals can be used: nitrates, oxides, hydroxides, carbonates, bicarbonates, nitrites, molybdates and salts of oxyacids or of organic mono- or poly-carboxylic acids such as formates, oxalates, citrates, tartrates.

The starting molybdenum compounds may be selected, according to the method employed for preparing the catalyst, from: ammonium molybdates, alkaline metals molybdates, molybdic acid, molybdic anhydride.

In the case of tungsten, tungstates of ammonium and of alkaline metals, tungstic acid and anhydride can be used, while in the case of vanadium, vanadates of ammonium or of alkaline metals, or, optionally, vanadic anhydride complexed with suitable amounts of citric or tartaric acid are suitable.

Cerium nitrate or molybdoceric acid are utilizable as cerium compounds.

Tellurium can be introduced in the form of telluric oxide or acid, or also as tellurium in powder.

The catalyst can be prepared according to the known methods of the art, for example those described in Italian Pat. Nos. 678,564, 682,880 and 789,588.

All the preparation methods entail a final activation step of the catalytic composition, consisting in a heating treatment in the presence of air at a temperature ranging from 350° to 650°C, preferably from 400° to 600°C.

Some proper methods of preparing the catalysts are indicated hereinafter:

1. An aqueous solution of the ammonium salt of the molybdoceric acid is mixed with a nitric solution of $TeO_2$ and nitrate of the alkaline metal and with a silica aerogel of the commercial type.

After evaporation, the catalyst is extruded, dried and activated at a temperature comprised between 400° and 600°C.

2. A nitric solution of telluric acid and nitrates of Ce and alkaline metal is added with a silica sol and then with an aqueous solution of ammonium paramolybdate. The mixture resulting therefrom is spray-dried, and the catalyst thus obtained in the form of particles is activated by heating up to a temperature between 400° and 600°C.

3. An aqueous solution of ammonium paramolybdate and/or ammonium metatungstate is admixed to a nitric solution of telluric acid and nitrates of cerium and alkaline metal. The solution resulting therefrom, having a volume equal to that of the carrier pores, is used to impregnate a silica of the commercial type, optionally of microspheroidal size.

The product obtained is dried for 12 hours at 110°–120°C and then activated at a temperature ranging from 400° to 600°C. Besides being used for impregnating the silica, the obtained solution can be evaporated to dryness, the residue can be ground and activated, thus obtaining a non-supported catalyst.

4. An aqueous solution of ammonium paramolybdate is added, under intense stirring, with metal tellurium in powder and then gradually with $H_2O_2$ at a high temperature.

Subsequently, further $H_2O_2$ is admixed at a low temperature, then $HNO_3$ and the nitrates of cerium and of alkaline metals. The solution thus obtained, once suitably diluted with water, is used to impregnate a silica of the commercial type according to the modalities described hereinbefore. The product is dried and activated.

5. Ammonium paramolybdate is dissolved in a $H_2O_2$ aqueous solution, thus forming an ammonium permolybdate aqueous solution. Separately, another solution, acidified by $HNO_3$, is prepared by dissolving telluric acid $H_2TeO_4.2H_2O$, alkaline metal nitrate and cerium nitrate.

The permolydate solution is then gradually poured into the one containing tellurium, cerium and the alkaline metal. The solution obtained, once suitably diluted, is used to impregnate a silica of the commercial type. The product is then dried and activated.

6. Catalysts, whose activated part includes, besides alkaline metals, tellurium, cerium, molybdenum, also vanadium, can be prepared as follows: a hot aqueous solution of ammonium paramolybdate, a nitric solution of ammonium metavanadate and a third solution, always acid due to nitric acid, of telluric acid, nitrates of cerium and of the alkaline metal, are poured on a suitable carrier.

The mass thus resulting is dried and activated by heating it up to a temperature ranging from 400° to 600°C.

The use of the catalysts described hereinabove enables to attain high methacrylonitrile yields at a very high isobutene conversion, up to 100%.

These results depend on the fact that the catalysts according to this invention promote an oxidation process having a regular trend and easily controllable as regards reaction temperature and contact times.

By carrying out the process for ammonoxidation of isobutene to methacrylonitrile according to this invention, air is used as preferred source of oxygen.

Steam too may be used as diluent, but it does not offer, from a view point of the reaction results, the advantages claimed in some of the known processes.

The reagents may be fed on the catalyst already preheated to a temperature near the reaction temperature or at room temperature; in which latter case they rapidly get warm when contacting the catalytic bed either fixed or fluidized.

The reagents may be fed on the catalyst already thoroughly premixed or partly premixed or thoroughly separated; the feeding of the separated or partially premixed reagents can be generally carried out more easily when the reactor is of the fluidized bed type.

It is also known and possible to feed to whole air amount and part of the olefin and/or of the ammonia to the reactor bottom and then to feed the remaining amounts of olefin and/or ammonia to one or more upper points inside the catalytic bed.

When the process according to the present invention is practised with a catalytic fluidized bed reactor, it may be particularly convenient to operate according to Italian Pat. No. 765,966. When carrying out the reaction according to the catalytic fixed bed technique, said bed can be realized, according to the art, by arranging the catalyst inside the tubes of a tube bundle reactor and by removing the reaction heat by making suitable fluids circulate outside the tubes and, for instance, more usually by means of mixtures of molten salts. It is possible also to operate in a reactor consisting of more adiabatic reaction stages alternated with cooling areas for the reacting mixture. The reaction is conducted at a temperature comprised between 350° and 500°C, preferably between 380° and 480°C.

The contact time, expressed in seconds as a ratio of the catalytic bed volume to the volumes per second of the reagents' fed gaseous mixture, measured under the temperature and pressure average conditions existing in the catalytic bed, may vary as a function of the temperature as well as of the catalytic bed nature, that is fixed or fluidized, and also of the catalyst size; generally the contact time is comprised between 0.1 and 20 seconds; a preferred interval being that from 0.3 to 15 seconds since corresponding to the most usual practical conditions of use.

The total pressure under which the reaction is conducted is of no particular importance and may therefore vary within wide limits, still it is suggested in part by considerations of economic nature: generally, however, it is operated at pressures close to the atmospheric pressure and, more exactly, at slightly higher pressures.

The process according to the present invention is carried out using reagent gaseous mixtures, in which the $NH_3$/isobutene molar ratio is comprised between 0.7 and 3, preferably between 1 and 2.3, and the $O_2$/isobutene molar ratio is comprised between 1.0 and 10, preferably between 1.5 and 5.

The following examples are given to better illustrate the present industrial invention, without being however a limitation thereof.

EXAMPLE 1

A. Catalyst preparation 38.40 g of ammonium paramolybdate $(NH_4)_6Mo_7O_{24}.4H_2O$ are dissolved in 20 ml of distilled $H_2O$ and 14 ml of 30% $H_2O_2$ (120 vol.). Separately another solution is prepared by dissolving 16.50g of $H_2TeO_4.2H_2O$, 6.20 g of $LiNO_3$ and 39.10 g of $Ce(NO_3)_3.6H_2O$ in 80 ml of $H_2O$ and 20.00 g of $HNO_3$ at 65% by weight.

The solution containing molybdenum is gradually poured into that containing tellurium, lithium and cerium.

The solution resulting therefrom is diluted with $H_2O$ to a volume equal to the volume of the pores of the siliceous carrier, said solution being used to impregnated an amount of microspheroidal silica of the commercial type corresponding to 175 g of dry silica.

The product obtained is dried for 12 hours at 110°–120°C and then activated in air at 500°C.

The catalyst thus obtained contains about 75% by weight of $SiO_2$.

In the catalyst chemical composition, the elements Te, Li, Ce, Mo are present according to the atomic ratios indicated by the formula: $Te_4Li_5Ce_5Mo_{12}$.

B. Ammoxidation process

This process has been carried out in a fixed bed reactor charged with the abovesaid catalyst.

The feeding mixture was made up of isobutene, $NH_3$ and air according to molar ratios 1/2.5/25.

The reaction temperature was of 420°C and the contact time of 1 second.

From an analysis of the reaction gases it results an isobutene conversion of 99.4%, a selectivity in methacrylonitrile of 81.1%, in acetonitrile of 4.8%, in acrylonitrile of 0.5%, in hydrocyanic acid of 4.0%, traces of aldehydes, CO =2.0% and $CO_2$=7.6%.

In the present case, selectivity means the ratio:

$$\frac{\text{obtained grams of C of the product considered}}{\text{grams of C of the reacted isobutene}} \times 100$$

EXAMPLES 2 to 20

They have been carried out by using the same equipment and the same feeding mixture as in Example 1.

The catalyst type as well as any further working conditions are reported on table 1.

TABLE 1

(Examples 2 to 20 in a fixed bed)

| No. | Atomic ratios among the catalyst's activated elements | T °C | t sec. | air/ /CH$_4$ (iso) | NH$_3$/C$_4$ (iso) | Conv. C$_4$ iso % | Selectivity % MAN | ACN | AN | HCN | (R)CO | CO+CO$_2$ | Yield MAN % |
|---|---|---|---|---|---|---|---|---|---|---|---|---|---|
| 2 | Li$_{9,88}$ Te$_4$ Ce$_5$ Mo$_{12}$ | 420 | 2 | 25 | 2,5 | 97,8 | 81,1 | 4,4 | 0,5 | 4,0 | 0,4 | 9,6 | 79,3 |
| 3 | Na$_4$ Te$_4$ Ce$_5$ Mo$_{12}$ | 420 | 1 | 25 | 2,5 | 98,2 | 78,2 | 7,2 | tr | 3,9 | 0,6 | 9,8 | 77,0 |
| 4 | Na$_7$ Te$_4$ Ce$_5$ Mo$_{12}$ | 420 | 2,5 | 25 | 2,5 | 97,0 | 74,2 | 4,1 | 0,2 | 3,7 | 1,5 | 16,3 | 70,0 |
| 5 | Rb$_1$ Te$_4$ Ce$_5$ Mo$_{12}$ | 440 | 0,6 | 25 | 2,5 | 95,2 | 78,3 | 6,2 | 0,5 | 3,9 | tr | 9,1 | 74,6 |
| 6 | Rb$_3$ Te$_4$ Ce$_5$ Mo$_{12}$ | 440 | 3 | 25 | 2,5 | 97,5 | 81,0 | 2,5 | 0,3 | 4,0 | 1,0 | 11,2 | 79,0 |
| 7 | Cs$_2$ Te$_4$ Ce$_5$ Mo$_{12}$ | 420 | 2 | 25 | 2,5 | 97,7 | 82,4 | 4,7 | 0,4 | 4,1 | 0,6 | 7,8 | 80,5 |
| 8 | Cs$_1$ Na$_2$ Te$_4$ Ce$_5$ Mo$_{12}$ | 420 | 1,5 | 25 | 2,5 | 99,9 | 79,1 | 6,0 | 0,6 | 4,7 | tr | 9,6 | 79,0 |
| 9 | Li$_3$ K$_1$ Te$_4$ Ce$_5$ Mo$_{12}$ | 400 | 2 | 25 | 2,5 | 99,5 | 79,0 | 6,5 | 0,3 | 4,8 | tr | 9,4 | 78,6 |
| 10 | K$_{1,65}$ Te$_4$ Ce$_5$ Mo$_{12}$ | 420 | 2 | 15 | 2,5 | 99,5 | 82,9 | 5,1 | 0,4 | 4,9 | 0,1 | 6,6 | 82,5 |
| 11 | K$_{3,35}$ Te$_4$ Ce$_5$ Mo$_{12}$ | 460 | 0,6 | 20 | 2,5 | 98,8 | 79,1 | 2,2 | 0,2 | 3,9 | 5,3 | 9,3 | 78,1 |
| 12 | K$_{3,35}$ Te$_4$ Ce$_7$ Mo$_{12}$ | 420 | 2 | 25 | 2,5 | 99,8 | 82,7 | 3,3 | 0,5 | 4,6 | tr | 8,9 | 82,7 |
| 13 | K$_{3,35}$ Te$_4$ Ce$_5$ Mo$_{12}$ | 430 | 1,5 | 25 | 2,5 | 100,0 | 85,5 | 3,5 | 0,4 | 3,4 | tr | 7,2 | 85,5 |
| 14 | K$_5$ Te$_2$ Ce$_5$ Mo$_{12}$ | 420 | 3 | 25 | 2,5 | 97,2 | 81,6 | 4,7 | 0,4 | 4,8 | 1,3 | 7,2 | 79,3 |
| 15 | K$_{5,15}$ Te$_1$ Ce$_5$ Mo$_{12}$ | 440 | 3 | 25 | 2,5 | 95,0 | 78,9 | 5,2 | 0,4 | 4,3 | 3,0 | 8,2 | 74,9 |
| 16 | K$_{4,9}$ Te$_6$ Ce$_5$ Mo$_{12}$ | 420 | 3 | 25 | 2,5 | 98,8 | 82,4 | 2,2 | 0,5 | 2,9 | 1,2 | 10,8 | 81,4 |
| 17 | K$_{2,5}$ Te$_4$ Ce$_5$ Mo$_{12}$ | 460 | 0,6 | 25 | 2,5 | 99,2 | 77,8 | 1,7 | 0,5 | 3,8 | 6,2 | 10,0 | 77,2 |
| 18 | K$_{2,5}$ Te$_4$ Ce$_5$ Mo$_{12}$ | 420 | 2 | 25 | 2,5 | 99,7 | 84,4 | 4,1 | 0,4 | 3,2 | 0,1 | 6,8 | 84,1 |
| 19 | K$_{1,60}$ Te$_4$ Ce$_5$ Mo$_{10}$ V$_2$ | 400 | 2 | 25 | 2,5 | 100,0 | 79,5 | 7,1 | 0,3 | 3,2 | tr | 9,9 | 79,5 |
| 20 | K$_{1,93}$ Te$_4$ Ce$_5$ Mo$_6$ W$_6$ | 420 | 2 | 25 | 2,5 | 96,7 | 72,1 | 11,2 | 0,7 | 2,4 | 0,4 | 13,2 | 69,6 |

MAN = methacrylonitrile
ACN = acetonitrile
AN = acrylonitrile
(R)CO = carbonylic compounds

EXAMPLES 21 to 24

Catalysts prepared according to the modalities of Example 1 A) have been charged to a fluidized bed reactor and tested in the process for ammonoxidation of isobutene to methacrylonitrile. The catalysts employed as well as the operating conditions and the results obtained are reported on table 2.

During all the tests, the pressure in the reactor was of 1.8 kg/cm² abs.

TABLE 2

(Examples 21–24 in a fluidized bed reactor)

| No. | Atomic ratios among the catalyst's activated elements | T °C | t sec. | aria/ CH$_4$-iso | NH$_3$/C$_4$ | Conv. C$_4$-iso % | Selectivity % MAN | ACN | AN | HCN | (R)CO | CO+CO | Yield MAN % |
|---|---|---|---|---|---|---|---|---|---|---|---|---|---|
| 21 | K$_5$ Te$_1$ Ce$_5$ Mo$_{12}$ | 420 | 5,5 | 25 | 2 | 96,9 | 73,3 | 1,7 | 0,6 | 5,6 | 1,8 | 17,0 | 71,0 |
| 22 | K$_{1,65}$ Te$_4$ Ce$_5$ Mo$_{12}$ | 380 | 2 | 25 | 2 | 74,0 | 80,0 | 2,1 | 0,4 | 7,3 | 2,9 | 7,4 | 59,2 |
| 23 | K$_{1,65}$ Te$_4$ Ce$_5$ Mo$_{12}$ | 420 | 5,5 | 25 | 1,5 | 99,9 | 76,7 | 0,7 | 0,8 | 6,9 | tr | 14,9 | 76,6 |
| 24 | K$_{1,65}$ Te$_4$ Ce$_5$ Mo$_{12}$ | 420 | 8 | 25 | 2 | 100,0 | 76,3 | 0,9 | 0,7 | 6,0 | tr | 16,1 | 76,3 |

EXAMPLE 25

The same catalyst of example 24 has been tested in the long run under the conditions described in example 24, giving after 625 h operation the following results:

```
Isobutene conversion    = 100%
Selectivity:
  in methacrylonitrile  = 75%
  in acrylonitrile      = 0.4%
  in acetonitrile       = 0.8%
  in HCN                = 6.5%
  in CO + CO₂           = 17.3%
```

What we claim is:

1. A process for converting isobutene to high yields of methacrylonitrile which comprises reacting isobutene with ammonia and oxygen, or with gaseous mixtures containing oxygen, in the gas phase, at a temperature of from 350°C to 500°C, and in the presence of a catalyst having the formula $$Me_vTe_xCe_yMo_{12}O_z \text{ or}$$

$$Me_vTe_xCe_yMo_{12-n}(V,W)_nO_z$$

wherein Me represents at least one element from the group consisting of Na, K, Li, Rb, Cs and mixtures thereof, and the various elements are present in atomic ratios such that $v = 0.3 - 18$; $X = 0.3 - 24$; $y = 0.3 - 21$, $z$ is the amount of oxygen bound to the other elements and corresponding to their oxidation state in the catalyst, and $n$ is a finite number up to 8 when molybdenum is partially substituted by at least one of the elements vanadium and tungsten, said catalyst being obtained by mixing, in an aqueous medium, compounds of Mo, Ce, Te and a compound of at least one element selected from the group consisting of Na, K, Li, Rb, Cs, and mixtures thereof, and when $n$ is a finite number up to 8, a compound selected from the group consisting of a vanadium compound, a tungsten compound and mixtures thereof. And then drying the mixture and heating it in the presence of air at a temperature of from 350°C to 650°C.

2. Process according to claim 1, in which the catalytic combination is supported on silica.

3. The process according to claim 1, in which the molybdenum in the catalyst is partially substituted by vanadium, tungsten or a mixture thereof according to the formula: $Me_vTe_xCe_yMo_{12-n}(V,W)_nO_z$ in which $v$, $x$, $y$ and $z$ have the same meaning as in claim 1 and $n$ is a finite number up to 6, and the compounds mixed in the aqueous medium to obtain the catalyst also include a compound of at least one of V and W.

* * * * *

UNITED STATES PATENT AND TRADEMARK OFFICE
CERTIFICATE OF CORRECTION

PATENT NO. : 3,898,267
DATED : August 5, 1975
INVENTOR(S) : Giorgio CAPORALI et al It is certified that error appears in the above–identified patent and that said Letters Patent are hereby corrected as shown below:

Col. 1, 4th line from below, the following formula should read

- - - $Me_v Te_x Ce_y Mo_{12-n}$ etc. - - -.

Col. 6, line 12, "iin" should read - - - in - - -.

Cols. 5 and 6, Table 1, line 2, under the name of MAN

"78.2" should read - - - 78.5 - - -.

Cols. 5 and 6, Table 2, under Selectivity % "CO + CO" should read

- - - $CO + CO_2$ - - -.

Col. 7, Claim 1, line 15, "isobbu-" should read - isobu - - -;

lines 21 and 22, the formula should read

"$Me_v Te_x Ce_y Mo_{12} O_z$   or   $Me_v Te_x Ce_y Mo_{12-n} (V,W)_n O_z$."

Col. 8, Claim 3, line 21, the formula should read

"$Me_v Te_x Ce_y Mo_{12-n} (V,W)_n O_z$."

Signed and Sealed this twenty-seventh Day of January 1976

[SEAL]

Attest:

RUTH C. MASON
Attesting Officer

C. MARSHALL DANN
Commissioner of Patents and Trademarks